United States Patent [19]

Spitz et al.

[11] Patent Number: 6,057,258
[45] Date of Patent: May 2, 2000

[54] SOLID CATALYTIC COMPONENT FOR THE POLYMERIZATION OF OLEFINS

[75] Inventors: Roger Spitz, Lyons; Thierry Saudemont, Salies de Bearn; Jean Malinge, Loubieng, all of France

[73] Assignee: Elf Atochem S.A., France

[21] Appl. No.: 09/104,983

[22] Filed: Jun. 26, 1998

[30] Foreign Application Priority Data

Jun. 30, 1997 [FR] France .................................. 97 08204

[51] Int. Cl.$^7$ ........................... B01J 31/12; B01J 27/135
[52] U.S. Cl. ........................ 502/152; 502/158; 502/227; 502/405
[58] Field of Search .................... 502/152, 158, 502/227, 405, 407, 415

[56] References Cited

U.S. PATENT DOCUMENTS

| | | | |
|---|---|---|---|
| 5,399,636 | 3/1995 | Alt et al. | 526/129 |
| 5,616,752 | 4/1997 | Patsidis et al. | 556/95 |
| 5,733,834 | 3/1998 | Soga et al. | 502/117 |
| 5,885,924 | 3/1999 | Ward | 502/402 |

FOREIGN PATENT DOCUMENTS

| | | |
|---|---|---|
| 708 116 | 4/1996 | European Pat. Off. . |
| H7-10916 | 1/1995 | Japan . |
| 7-316219 | 12/1995 | Japan . |
| 8-259617 | 10/1996 | Japan . |

OTHER PUBLICATIONS

French Search Report dated Feb. 16, 1998.

Soga, et al., Catalyst Design for Tailor–Made Polyolefins, Mar. 10–12, 1994, pp. 307–314.

Soga, Highly Isospecifi, Immobilized Zirconocene Catalysts Support on Chemically Modified SiO2, 1995, pp. 249–258, Macromol. Symp. 89.

Soga, et al, Polymerization of Propene with Highly Isospecific SiO2–supported Zirconocene Catalysts Activated with Common Alkylaluminiums, 1994, pp. 3347–3360, Macromol. Chem. Phys., 195.

*Primary Examiner*—Lorna M. Douyon
*Assistant Examiner*—John R Hardee

[57] ABSTRACT

The invention relates to a process for the preparation of a solid catalytic component of metallocene type for the polymerization of olefins comprising a stage of reaction between a support and a derivative of formula $R^1M^1X^1_3$, in which $R^1$ represents a hydrocarbon radical, $M^1$ represents a silicon, germanium or tin atom and $X^1$ represents a halogen atom. The solid catalytic component according to the invention exhibits a high activity in the polymerization or copolymerization of olefins and can lead to polymers or copolymers of high molecular mass and of low polydispersity, for example less than 2.5.

22 Claims, No Drawings

SOLID CATALYTIC COMPONENT FOR THE POLYMERIZATION OF OLEFINS

FIELD OF THE INVENTION

The invention relates to a solid catalytic component for the polymerization or copolymerization of at least one olefin.

BACKGROUND OF THE INVENTION

Catalysts of metallocene type are particularly of interest when it is proposed to prepare polymers or copolymers of reduced polydispersity, for example in the region of 2. However, these catalysts are generally suited to homogeneous polymerization processes and there exists no solid catalytic component of metallocene type suited to heterogeneous polymerization processes, that is to say to suspension or gas-phase processes, which exhibits high activity and which is easy to prepare. Furthermore, solid catalytic components of metallocene type are prepared so that the metallocene entity is in fact adsorbed at the surface of a solid without a strong bond with the latter. For this reason, a loss in activity is commonly observed over time, the metallocene entity having a tendency to be released from the surface of the solid. This problem is, for example, more particularly significant in the case of suspension polymerization or copolymerization processes.

The patent application published under No. J07316219 describes a catalytic component comprising a stage of reaction between a silica and $SiCl_4$ and its use in the polymerization of propylene. Such a component exhibits a very low activity in the polymerization of an olefin such as propylene or ethylene.

DESCRIPTION OF THE INVENTION

The invention makes it possible to overcome the above-mentioned problems.

The solid catalytic component according to the invention exhibits a high activity in the polymerization or copolymerization of at least one olefin such as ethylene or propylene. The solid catalytic component according to the invention can lead to polymers or copolymers of high molecular mass, for example in which the weight-average molecular mass is greater than 100,000 and in which the polydispersity is low, for example less than 2.5. The solid catalytic component according to the invention exhibits an activity which is maintained at a high level over time.

The invention also relates to a process for the manufacture of a solid catalytic component. The process according to the invention comprises:

a stage (a) of reaction between a support and a halogenated derivative which can be represented by the formula $R^1M^1X^1_3$, in which $R^1$ represents a hydrocarbon radical, such as, for example, an alkyl, cycloalkyl, aryl, arylalkyl or alkylaryl radical, which can comprise from 1 to 20 carbon atoms, $M^1$ represents a silicon, germanium or tin atom and $X^1$ represents a halogen atom, in order to obtain a solid $S^1$, then a stage (b) of reaction between the solid $S^1$ and a compound C capable of grafting at least one group with the cycloalkadienyl skeleton L to the atom $M^1$ belonging to the species fixed to the support and resulting from $R^1M^1X^1_3$, in order to obtain a solid $S^1$, then a stage (c) of reaction between the solid $S^2$ and a deprotonating agent D capable of pulling off a proton from the group L which can be represented by the formula $R^2M^2X^2_n$, in which $R^2$ represents a hydrogen atom or a hydrocarbon group, $M^2$ represents a lithium, sodium, potassium or magnesium atom, $X^2$ represents a halogen atom and n represents a number equal to 0, if $M^2$ is a lithium, sodium or potassium atom, or equal to 1, if $M^2$ is a magnesium atom, in order to obtain a solid $S^3$, then a stage (d) of reaction between the solid $S^3$ and a derivative of a transition metal which can, for example, be represented by the formula $R^3_{y-z}M^3X^3_z$, in which $R^3$ can represent a hydrocarbon radical, such as, for example, an alkyl radical comprising from 1 to 20 carbon atoms, $M^3$ represents a transition metal, X represents a halogen and y and z represent non-zero integers such that y, is equal to 3 or 4 and z ranges from 1 to y, in order to obtain a solid catalytic component.

The support is provided in the form of particles and can be any array of organic or inorganic particles commonly used as a support for a solid catalytic component for the polymerization of olefins. The support can be, for example, a porous inorganic oxide, such as silica or alumina or a mixture of at least two of these oxides. A support made of porous inorganic oxide preferably comprises pores with a diameter ranging from 7.5 to 30 nm (75 to 300 Å). A porous inorganic oxide support preferably exhibits a porosity ranging from 1 to 4 cm$^3$/g.

The support preferably exhibits a specific surface ranging from 100 to 600 m$^2$/g.

The support generally exhibits a mean particle size diameter ranging from 10 to 100 μm.

The support preferably exhibits, at its surface, from 0.5 to 10 and more preferably 1 to 8 hydroxyl groups, that is to say —OH radicals, per nm$^2$.

The support can be varied in nature. Depending on its nature, its state of hydration and its ability to retain water, it is possible to subject it to more or less intense dehydration treatments, depending on the desired surface content of hydroxyl groups.

A person skilled in the art can, by routine tests, arrive at the dehydration treatment which it is appropriate to apply to the support which he has chosen, depending on the desired surface content of hydroxyl groups.

For example, if the support is made of silica, the silica can be heated between 100 and 1000° C. and preferably between 140 and 800° C. while flushing with an inert gas, such as nitrogen or argon, at atmospheric pressure or preferably under vacuum, for example with an absolute pressure of $1\times10^{-2}$ millibar, for example for at least 60 min. For this heat treatment, the silica can be mixed, for example, with $NH_4Cl$, so as to accelerate the dehydration.

If this heat treatment is between 100 and 450° C., it is possible to envisage following it by a silanization treatment. This type of treatment results in the surface grafting of the support with a species derived from silicon, in order to render this surface more hydrophobic. This silane can, for example, be an alkoxytrialkylsilane, such as methoxytrimethylsilane, or a trialkylchlorosilane, such as trimethylchlorosilane or triethylchlorosilane.

This silane is generally applied to the support by preparing a suspension of this support in an organic solution of the silane. This silane can, for example, be at a concentration of between 0.1 and 2 mol per litre in this solution. The solvent of this solution can be chosen from linear or branched aliphatic hydrocarbons, such as hexane or heptane, optionally substituted alicyclic hydrocarbons, such as cyclohexane, or aromatic hydrocarbons, such as toluene, benzene or xylene. The treatment of the support by the silane solution is generally carried out between 50° C. and 150° C. for 1 to 48 hours with stirring.

After silanization, the solvent is removed, for example by siphoning or filtration, the support then being washed, preferably copiously, for example with 0.3 of solvent per gram of support.

The surface level of hydroxyl groups in the support can be quantitatively determined according to known techniques, such as, for example,

- by reaction of an organomagnesium compound, such as $CH_3MgI$, with the support, with measurement of the amount of methane given off [M$^c$Daniel, J. Catal., 67, 71 (1981)],
- by reaction of triethylaluminium with the support, with measurement of the amount of ethane given off [Thesis by Véronique Gaschard-Pasquet, Université Claude Bernard-Lyon 1, France, 1985, pages 221–224].

The halogenated derivative $R^1M^1X^1_3$ can be chosen such that $M^1$ is silicon and can be chosen from the following list:

ethyltrichlorosilane, n-propyltrichlorosilane, isopropyltrichlorosilane, n-butyltrichlorosilane, isobutyltrichlorosilane, tert-butyltrichlorosilane, methyltrichlorotin, phenyltrichlorosilane, and is preferably methyltrichlorosilane.

The compound C is capable of grafting at least one group with the cycloalkadienyl skeleton L to the atom $M^1$ belonging to the species fixed to the support resulting from $R^1M^1X^1_3$, by breaking at least one $M^1$–$X^1$ bond and forming at least one $M^1$–L bond.

The group L can comprise from 5 to 20 carbon atoms. A group with the cycloalkadienyl skeleton is either a cycloalkadienyl radical or a substituted cycloalkadienyl radical, for example substituted by a saturated or unsaturated hydrocarbon group.

A cycloalkadienyl radical is a radical comprising a ring of carbon atoms, the said ring comprising at least two carbon-carbon double bonds, the said radical being connected to the remainder of the molecule carrying it via a covalent bond with one of the carbon atoms of the said ring. At least one of the carbon atoms of the ring of the cycloalkadienyl radical is bonded to at least one hydrogen atom, as is the case, for example, with the tetramethylcyclopentadienyl radical, whereas this is not the case with the pentamethylcyclopentadienyl radical.

L can represent the cyclopentadienyl radical, the indenyl radical, the methylcyclopentadienyl radical or the tetramethylcyclopentadienyl radical.

The compound C can be, for example, chosen from those represented by the formulae LY or LMgX or $LSiZ^1Z^2Z^3$, in which Y represents a lithium or sodium atom, X represents a chlorine, bromine or iodine atom, L represents a radical with the cycloalkadienyl skeleton as defined above and $Z^1$, $Z^2$ and $Z^3$, which can be identical or different, represent a linear or branched or cyclic hydrocarbon radical which can comprise one to twenty carbon atoms and which can be an alkyl, cycloalkyl, aryl, arylalkyl or alkylaryl radical.

The compound C can be obtained by reaction of a cyclopentadiene derivative and of a deprotonating compound.

Mention may be made, as cyclopentadiene derivative, of cyclopentadiene, methylcyclopentadiene, ethylcyclopentadiene, propylcyclopentadiene, butylcyclopentadiene, pentylcyclopentadiene, hexylcyclopentadiene, phenylcyclopentadiene, 1-naphthylcyclopentadiene, 9-phenanthrylcyclopentadiene, 10-anthracenylcyclopentadiene, trifluoromethylcyclopentadiene, methoxycyclopentadiene, ethoxycyclopentadiene, trimethylsilylcyclopentadiene, trimethylsiloxycyclopentadiene, monofluorocyclopentadiene, monochlorocyclopentadiene, monobromocyclopentadiene, dimethylcyclopentadiene, diethylcyclopentadiene, methylethylcyclopentadiene, methylpropylcyclopentadiene, methylbutylcyclopentadiene, trimethylcyclopentadiene, tetramethylcyclopentadiene, indene, 2-methylindene, 2,9-dimethylindene, 2,6-dimethylindene, 2,7-dimethylindene, 2-methyl-4-(i-propyl) indene, 2-methyl-4-phenylindene, 2-methyl-4-(1-naphthyl) indene, 2-ethyl-4-(i-propyl)-indene, 2-butyl-4-(i-propyl) indene, 4,5,6,7-tetra-hydroindene, 2-methyl-4-5,6,7-tetrahydroindene, fluorene, 2,7-dimethylfluorene, 2,7-diethylfluorene, 2,7-di(i-propyl)fluorene, 2,7-di(tbutyl) fluorene, 3,6-di(i-propyl)fluorene or 3,6-di(tbutyl)fluorene.

The deprotonating compound can be chosen from the same family as that of the deprotonating agents D used in stage (c) and defined hereinbelow.

In order to prepare the compound C by a contact reaction between a cyclopentadiene derivative and a deprotonating compound, the cyclopentadiene derivative and the deprotonating compound are mixed in an inert solvent and then reacted between −78° C. and 100° C., for example between 10 min and 96 hours, more favourably between 1 h and 48 h. The reaction is carried out under an inert gas atmosphere, such as nitrogen or argon. During the preparation of the compound C, the amount used of the deprotonating compound and that of the cyclopentadiene derivative are such that the molar ratio of the deprotonating compound to the cyclopentadiene derivative ranges from 1 to 5 and preferably from 1 to 2. The amount of inert solvent employed per 1 millimol of cyclopentadiene derivative can be between 1 and 50 ml and preferably between 2 and 20 ml.

Mention may be made, as inert solvent used during the preparation of the compound C, of aliphatic hydrocarbons, such as heptane or hexane, aromatic hydrocarbons, such as benzene, toluene, xylene, cumene or cymene, alicyclic hydrocarbons, such as cyclopentane, cyclohexane, cyclooctane, methylcyclopentane or methylcyclohexane, or compounds of ether type, such as diethyl ether or tetrahydrofuran. Aromatic hydrocarbons are preferred among these solvents. It is not essential to remove the solvent in order to continue the preparation of the solid catalytic component according to the invention. However, if it is desired to remove it, it can be done by the usual separation techniques. If the compound C appears in solution in the solvent, it is possible, for example, to crystallize it, for example under cold conditions, and then to remove the solvent by siphoning or filtration. If the compound C is in suspension in the solvent, the siphoning or the filtration, to remove the solvent, can be carried out directly.

The deprotonating agent D is of formula $R^2M^2X^2_n$, in which $R^2$ represents a hydrogen atom or a hydrocarbon group, such as an alkyl group in which the number of carbon atoms is between 1 and 20, an aryl group in which the number of carbon atoms is between 6 and 20 or an aralkyl group in which the number of carbon atoms is between 7 and 20. Mention may be made, as example of alkyl group in which the number of carbon atoms is between 1 and 20, of: methyl, ethyl, propyl, butyl, hexyl, cyclohexyl, octyl, nonyl, dodecyl or eicosyl.

Mention may be made, as example of aryl group in which the number of carbon atoms is between 6 and 20, of: phenyl, tolyl or xylyl. Mention may be made, as example of aralkyl group in which the number of carbon atoms is between 7 and 20, of: benzyl or phenylethyl. In the formula $R^2M^2X^2_n$, X represents a halogen atom, such as fluorine, chlorine, bromine or iodine.

Mention may be made, as deprotonating agent D, of methyllithium, a butyllithium, such as n-butyllithium, sec-butyllithium or tert-butyllithium, phenyllithium, benzyllithium, methylmagnesium chloride, ethylmagnesium chloride, phenylmagnesium bromide, potassium hydride or sodium hydride.

The agent D is capable of pulling off a proton from the group L. By way of example, this reaction in which the proton is pulled off takes place, for the case where L comprises a methylene group in its ring and for the case where D is a lithium derivative, between the methylene group and D according to:

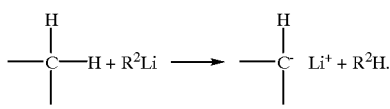

The derivative of a transition metal can, for example, be represented by the formula $R^3_{y-z}M^3X_z$, in which $R^3$ can represent a hydrocarbon radical, such as, for example, an alkyl, cycloalkyl, aryl, aralkyl or alkylaryl radical comprising from 1 to 20 carbon atoms, $M^3$ represents a transition metal chosen from the elements from groups 4, 5, 6, 7, 8, 9 and 10 of the periodic classification of the elements, according to the new notation as defined in the Handbook of Chemistry and Physics, seventy-fifth edition, 1994–1995 (which corresponds to the groups IVB to VIII according to the former notation), the said transition metal preferably being chosen from titanium, vanadium, hafnium, zirconium or chromium, and X represents a halogen atom, such as chlorine, bromine or iodine. The lanthanides and actinides are regarded as forming part of column 3 of the periodic classification of the elements according to the new notation (i.e. column IIIB of the former notation) and are therefore not envisaged for $M^3$ in the context of the present application.

Mention may be made, as example of such a derivative of a transition metal, of: $TiCl_4$, $TiBr_4$, $TiI_4$, $ZrCl_4$, $ZrBr_4$, $ZrI_4$, $HfCl_4$, $HfBr_4$, $HfI_4$, $VCl_4$, $NbCl_4$, $TaCl_5$, $MoCl_5$ or $WCl_5$. Among them, it is preferable to use a titanium halide, a zirconium halide or a hafnium halide.

The derivative of a transition metal can also be a complex between one of the compounds of formula $R^3_{y-z}M^3X_z$ described above and an electron-donating compound, such as tetrahydrofuran.

In order to carry out stage (a), the support and the halogenated derivative can be brought into contact in the presence of an inert solvent, which can be chosen, for example, from aliphatic hydrocarbons, such as hexane or heptane, aromatic hydrocarbons, such as benzene, toluene, xylene, cumene or cymene, alicyclic hydrocarbons, such as cyclopentane, cyclohexane, cyclooctane, methylcyclopentane or methylcyclohexane, or ethers, such as diethyl ether or tetrahydrofuran, under an atmosphere of an inert gas, such as nitrogen or argon.

The molar ratio of the halogenated derivative to the surface hydroxyl groups of the support is generally between 0.5 and 30 and preferably ranges from 1 to 20. Use is preferably made of 5 to 100 ml and more preferably of 10 to 50 ml of an inert solvent per gram of support. This operation of bringing into contact can be carried out between 80 and 150° C., with stirring, if appropriate under pressure, if the nature of the solvent requires it. On conclusion of stage (a), it is advisable to wash the solid $S^1$ with an inert solvent of the type of those provided for carrying out the said stage (a). The solid $S^1$ can subsequently be recovered by siphoning or filtration.

In order to carry out stage (b), the solid $S^1$ and the compound C can be brought into contact in the presence of an inert solvent, which can be chosen, for example, from aliphatic hydrocarbons, such as hexane or heptane, aromatic hydrocarbons, such as benzene, toluene, xylene, cumene or cymene, alicyclic hydrocarbons, such as cyclopentane, cyclohexane, cyclooctane, methylcyclopentane or methylcyclohexane, or ethers, such as diethyl ether or tetrahydrofuran, preferably under an atmosphere of an inert gas, such as nitrogen or argon. This operation of bringing into contact can be carried out between −78 and 140° C., preferably between 0 and 110° C., for example between 1 and 48 hours.

For this operation of bringing into contact, the amount of $S^1$ and the amount of compound C are such that the molar ratio of the amount of C to the amount of halogenated derivative used during stage (a) in order to obtain the said amount of $S^1$ preferably ranges from 2 to 10 and more preferably from 2 to 4.

Use is preferably made of 50 ml of inert solvent per gram of $S^1$.

After this operation of bringing into contact, the solid $S^2$ obtained can be isolated by filtration or after siphoning off the solvent. It is preferable to wash $S^2$ copiously, for example with 300 ml of inert solvent per gxam of $S^2$.

In order to carry out stage (c), the solid 2 and the deprotonating agent D can be brought into contact in the presence of an inert solvent, which can be chosen, for example, from aromatic hydrocarbons, such as benzene, toluene, xylene, cumene or cymene, alicyclic hydrocarbons, such as cyclopentane, cyclohexane, cyclooctane, methylcyclopentane or methylcyclohexane, or ethers, such as diethyl ether or tetrahydrofuran, preferably under an atmosphere of an inert gas, such as nitrogen or argon. This operation of bringing into contact can be carried out between −78 and 110° C. and preferably between −30 and 100° C., for example between 1 and 48 hours. For this operation of bringing into contact, the amount of $S^2$ and the amount of D are such that the molar ratio of the amount of D to the amount of compound C used during stage (b) in order to obtain the said amount of $S^2$ preferably ranges from 1 to 10 and more preferably from 1 to 5.

Use is preferably made of 20 to 100 ml of solvent per gram of $S^2$. After this operation of bringing into contact of stage (c), the solid $S^3$ obtained can be isolated by filtration or siphoning off the solvent. It is preferable to wash $S^3$ copiously, for example with 300 ml of inert solvent per gram of $S^3$.

In order to carry out stage (d), the solid $S^3$ and the derivative of a transition metal can be brought into contact in the presence of an inert solvent, which can be chosen, for example, from aliphatic hydrocarbons, such as hexane or heptane, aromatic hydrocarbons, such as benzene, toluene, xylene, cumene or cymene, alicyclic hydrocarbons, such as cyclopentane, cyclohexane, cyclooctane, methylcyclopentane or methylcyclohexane, or ethers, such as diethyl ether or tetrahydrofuran, preferably under an atmosphere of an inert gas, such as nitrogen or argon. This operation of bringing into contact ca., be carried out between −100° C. and 110° C. and preferably between −80° C. and 100° C., for example between 1 and 48 hours. For this operation of bringing into contact, the amount of $S^3$ and the amount of derivative of a transition metal are such that the molar ratio of the amount of derivative of a transition metal to the amount of D used during stage (c) in order to obtain the said amount of $S^3$ preferably ranges from 0.5 to 5 and more preferably from 0.5 to 3. Use is preferably made of 5 to 50 ml of solvent per gram of $S^3$. On conclusion of this reaction, the solid catalytic component obtained can be isolated by filtration, washed, for example with 300 ml of inert solvent per gram of solid catalytic component, and then dried under an atmosphere of an inert gas, such as nitrogen or argon, for example from 0 to 80° C., if appropriate under vacuum.

The solid catalytic component according to the invention preferably comprises from 0.02 to 2 and preferably from 0.05 to 1 millimol of transition metal per gram and it is recommended to use the process according to the invention so as to obtain such a content in the solid catalytic component.

The catalytic component can be used in the polymerization or copolymerization of at least one olefin. Olefin is more particularly understood to mean those comprising two to twenty carbon atoms and in particular the alpha-olefins of this group. Mention may be made, as olefin, of ethylene, propylene, 1-butene, 4-methyl-1-pentene, 1-octene, 1-hexene, 3-methyl-1-pentene, 3-methyl-1-butene, 1-decene, 1-tetradecene or the mixtures of at least two of these olefins. The component according to the invention can be introduced into suspension, solution or gas-phase polymerization or copolymerization processes under the usual conditions for this type of catalytic component. For the case where the aim is to obtain a polymer or copolymer exhibiting a shape substantially homothetic with that of the catalytic component, it is advisable to choose a suspension or gas-phase process.

A suspension polymerization or copolymerization process consists in carrying out a polymerization or copolymerization in an inert medium which does not dissolve, or which only very slightly dissolves, the polymer or copolymer which is being formed. For such a process, n-heptane, n-hexane, isohexane, isobutane or a mixture of heptane isomers can be chosen as inert medium and the process can be carried out at temperatures ranging up to 250° C. and under pressures ranging from atmospheric pressure to 250 bar.

A gas-phase polymerization process can be carried out using any reactor allowing gas-phase polymerization and in particular in a stirred-bed and/or fluidized-bed reactor.

The conditions for carrying out the gas-phase polymerization, in particular temperature, pressure, injection of the olefin or olefins into the stirred-bed and/or fluidized-bed reactor, and control of the temperature and pressure of the polymerization, are analogous to those provided in the prior art for the gas-phase polymerization of olefins. The polymerization is generally carried out at a temperature below the melting point M.t. of the polymer or prepolymer to be synthesized, and more particularly between +20° C. and (M.t.−5)° C., and under a pressure such that the olefin or olefins are essentially in the vapour phase.

Depending on the nature of the derivative of a transition metal, it may be necessary to introduce, into the polymerization or copolymerization medium, a cocatalyst capable of activating the said transition metal. For example, when the derivative of a transition metal is titanium, zirconium or hafnium, the cocatalyst can be chosen from organic aluminium derivatives.

This organic aluminium derivative can be a derivative of formula $R^7R^8R^9Al$, in which $R^7$, $R^8$ and $R^9$, which can be identical or different, each represent either a hydrogen atom or a halogen atom or an alkyl group containing from 1 to 20 carbon atoms, at least one of $R^7$, $R^8$ or $R^9$ representing an alkyl group. Mention may be made, as example of suitable compound, of ethylaluminium dichloride or dibromide or dihydride, isobutylaluminium dichloride or dibromide or dihydride, diethylaluminium chloride or bromide or hydride, di-n-propylaluminium chloride or bromide or hydride, or diisobutylaluminium chloride or bromide or hydride. Use is preferably made, with the abovementioned compounds, of a trialkylaluminium, such as tri-n-hexylaluminium, triisobutylaluminium, trimethylaluminium or triethylaluminium.

The cocatalyst can also be an aluminoxane. This aluminoxane can be linear, of formula

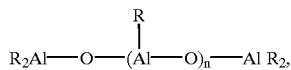

or cyclic, of formula

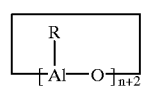

R representing an alkyl radical comprising from one to six carbon atoms and n being an integer ranging from 0 to 40, preferably from 0 to 20. The aluminoxane can comprise R groups of different nature. Preferably, the R groups all represent methyl groups. Moreover, cocatalyst is also understood to mean the mixtures of the abovementioned compounds.

The amounts of cocatalyst used must be sufficient to activate the transition metal. Generally, when an organic aluminium derivative is used as cocatalyst, an amount thereof is introduced such that the atomic ratio of the aluminium introduced by the cocatalyst to the transition metal or metals which it is desired to activate ranges from 0.5 to 10,000 and preferably from 1 to 5000.

The polymerization or copolymerization can involve a chain-transfer agent, so as to control the melt flow index of the polymer or copolymer to be produced. Hydrogen can be used as chain-transfer agent and is introduced in an amount which can range up to 90 mol % and is preferably between 0.01 and 60 mol % of the combined olefins and hydrogen introduced into the reactor.

For the case where excellent morphological control of the particles is desired, it is recommended to carry out a suspension or, preferably, gas-phase prepolymerization on the particles of solid catalytic component and then to introduce the prepolymer particles thus obtained into the suspension or gas-phase polymerization or copolymerization process. The prepolymerization is carried out up to a degree suited to the polymerization- process in which the prepolymer will subsequently be employed.

The term prepolymer of course includes copolymers obtained by copolymerization with a low degree of progression. The term prepolymerization thus also includes a copolymerization with a low degree of progression.

EXAMPLES

In the following examples, the following techniques were used:

determination of the amount of surface hydroxyl groups: by reaction of triethylaluminium with the support, with measurement of the amount of ethane given off [Thesis of Véronique Gashard-Pasquet, Université Claude Bernard-Lyon 1, France, 1985, pages 221–224].

weight-average molecular mass (Mw): by steric exclusion chromatography at 140° C. in 1,3,5-trichlorobenzene.

EXAMPLE 1

1. SYNTHESIS OF A SOLID CATALYTIC COMPONENT a) 3 g of silica, of trademark Grace 332, are brought to 550° C. for 2 hours under a nitrogen stream of 60 ml per min according to the following temperature programme:

from 20 to 100° C. over 30 min; from 100 to 130° C. over 30 min; from 130 to 550° C. over 1 h 30 min; stationary phase at 550° C. for 2 hours, then return to room temperature by natural cooling.

This treatment results in a silica containing 0.8 millimol of hydroxyl groups per gram of silica.

b) 2 g of the silica prepared in a) are suspended in 30 ml of toluene and then 0.3 g of $CH_3SiCl_3$ (i.e. 2 millimol of $CH_3SiCl_3$) is introduced. The medium is then heated for 48 hours at 100° C. The solid is filtered off and then washed four times with 40 ml of toluene on each occasion.

c) 3 millimol of indene are placed in 30 ml of toluene and then 3.5 millimol of butyllithium (BuLi) are introduced dropwise in the form of a 1.6 mol per litre solution in hexane.

The reaction is allowed to take place at 20° C. for 24 hours, the reaction mixture is then heated for 1 hour at 80° C. and then the reaction mixture is allowed to return to room temperature.

d) All the solid obtained in b) is mixed with all the indenyllithium solution prepared in c). This mixture is brought to 100° C. for 76 hours and then, after returning to room temperature, the solid obtained is filtered off and washed 4 times with 50 ml of toluene on each occasion.

e) The solid obtained in d) is placed in 30 ml of toluene, to which are added 3.5 millimol of BuLi. The mixture is left for 24 hours at room temperature. The solid obtained is subsequently filtered off and washed 4 times with 40 ml of toluene on each occasion.

f) 4.3 millimol of $ZrCl_4$, in the crystalline powder form, are placed in 30 ml of toluene and 0.7 ml of tetrahydrofuran (THF) is introduced dropwise. This mixture is brought to 100° C. for 24 hours.

g) The suspension prepared in f) is mixed with the solid prepared in e) and the combined mixture is brought to 100° C. for 24 hours and then cooled to room temperature.

The solid catalytic component obtained is filtered off and washed 4 times with 40 ml of toluene and then dried under 10 mbar of argon at 40° C. for one hour.

2. POLYMERIZATION OF ETHYLENE 330 ml of heptane, an amount of methylaluminoxane containing 3.3 millimol of aluminium, the said aluminoxane being of Witco trademark and in the form of a solution containing 2 millimol of aluminium per litre of toluene, and 9 mg of the solid catalytic component are placed in a 1 l round-bottomed glass flask. This suspension is introduced into a 1 litre glass reactor which is purged with argon and stirred. The ethylene is suspension-polymerized under 4 bar at 22° C. for 1 hour. 21 g of polymer are recovered with a polydispersity equal to 2.1 and with an Mw=969,600.

EXAMPLE 2

The procedure is as in Example 1, except that, for the polymerization:

11 mg of solid catalytic component are introduced, the polymerization is carried out at 80° C. for 5 minutes.

The activity was 25,000 g/g.h.

EXAMPLE 3

1. SYNTHESIS OF A SOLID CATALYTIC COMPONENT 2.4 millimol of $ZrCl_4$, in the powder form, are placed in suspension in 30 ml of toluene in a Schlenk tube. This suspension is cooled to −15° C. and then 4.8 millimol of BuLi, in the form of a 1.6 mol/litre solution in hexane, are added thereto dropwise.

The reaction is allowed to take place for 20 hours, while allowing the temperature to return naturally to room temperature. After cooling the mixture to 0° C., 2.7 g of the solid obtained on conclusion of stage e) in Example 1 are then added to it. The reaction is allowed to take place for 24 hours, while allowing the temperature to return naturally to room temperature.

The solid catalytic component obtained is filtered off and washed 4 times with 40 ml of toluene on each occasion and then dried under 10 mbar of an argon stream at 40° C. for 30 minutes.

2. POLYMERIZATION OF ETHYLENE 350 ml of heptane, an amount of methylaluminoxane containing 3.5 millimol of aluminium, the said aluminoxane being of Witco trademark and in the form of a solution containing 2 millimol of aluminium per litre of toluene, and 86 mg of the solid catalytic component are placed in a 1 l round-bottomed glass flask. The polymerization of the ethylene is carried out under the same conditions as in Example 2. The productivity is 150 g/g over 35 minutes.

EXAMPLE 4 (comparative)

1. SYNTHESIS OF A SOLID CATALYTIC COMPONENT a) 2.9 g of silica, treated as in a) of Example 1, are placed in 30 ml of toluene and then 1.1 millimol of $SiCl_4$ are introduced dropwise. This suspension is brought to reflux for 48 hours. The solid obtained is filtered off and washed with 2 times 50 ml of THF.

b) 0.35 ml of indene are introduced into 30 ml of THF in a 100 ml Schlenk tube, 3 millimol of BuLi are then added dropwise in the form of a 1.6 mol/litre solution in hexane at 0° C. and the solution is allowed to return to room temperature. The reaction is allowed to continue at room temperature for 14 hours.

c) After having cooled it to 0° C., the solution prepared in b) is introduced into a tube containing the solid prepared in a), itself precooled to 0° C., and 10 ml of THF, cooled to 0° C., are added. The mixture is allowed to return to room temperature and left for a further 14 hours at this temperature. The solid obtained is filtered off and washed 3 times with 50 ml of THF on each occasion and then dried under 10 mbar of argon for 1 hour at 20° C.

d) The solid obtained in c) is placed in 30 ml of tetrahydrofuran (THF) cooled to 0° C., to which 3 millimol of BuLi, precooled to 0° C., are added. The mixture is allowed to return to room temperature and is left at this temperature for 24 hours. The solid obtained is subsequently filtered off and washed 3 times with 50 ml of THF on each occasion.

e) 2.5 millimol of $ZrCl_4$, in the powder form, are placed in suspension in 30 ml of toluene. After adding 5 millimol of THF, the mixture is heated at 100° C. for 48 hours. The solvent is subsequently removed by siphoning at room temperature. 0.25 mol of THF is then added.

f) The solid obtained in d) is placed in 0.37 mol of THF (30 ml) and the solution prepared in e) is added dropwise. The reaction is allowed to take place for 24 hours at room temperature. The solid catalytic component is filtered off and washed four times with 50 ml of THF on each occasion.

2. POLYMERIZATION OF ETHYLENE 360 ml of heptane, an amount of methylaluminoxane containing 3.6 millimol of aluminium, the said methylaluminoxane being in the form of a solution containing 2 millimol of aluminium per litre in toluene, and 19 mg of the solid catalytic component are placed in a 1 l round-bottomed flask. The polymerization of the ethylene is carried out at 4 bar, 80° C. for ½ hour. The activity was approximately 1 g/g.h.

EXAMPLE 5

The procedure is as in Example 4, except that the $SiCl_4$ is replaced by the same number of moles of $CH_3SiCl_3$. The activity was 50 g/g.h.

EXAMPLE 6 (comparative)

The procedure is as in Example 14 of Patent Application J 07316219. Over 20 hours, a productivity of 0.35 g of polypropylene per hour and per gram of solid catalytic component is obtained.

EXAMPLE 7

The procedure is as in Example 6, except that the $SiCl_4$ is replaced by the same number of moles of $CH_3SiCl_3$. Over 1 hour, a productivity of 4 g of polypropylene per hour and per gram of solid catalytic component is obtained.

EXAMPLE 8

500 ml of heptane, an amount of methylaluminoxane comprising 5 millimol of aluminium, the said methylaluminoxane being in the form of a solution containing 2 millimol of aluminium per litre of toluene, and 48 mg of the solid catalytic component prepared in §1 in Example 1 are placed in a 1 litre round-bottomed glass flask. The suspension obtained is subsequently introduced into a 1 litre reactor under argon and with stirring and the propylene is polymerized therein under 4 bar at 70° C. for 3 hours. The polymer obtained is atactic. The productivity was 260 g of polymer per gram of component over one hour.

EXAMPLE 9

99 g of high density polyethylene in the powder form, 15 ml of a 30% by weight solution of methylaluminoxane in toluene, i.e. 70 millimol of aluminium, and 0.64 g of the solid catalytic component prepared according to Example 1 are introduced into a Schlenk tube. The medium is kept stirring at room temperature for 15 minutes. The solid is dried by stripping under vacuum (10 mbar of nitrogen) at room temperature for 2 hours.

1. PREPOLYMERIZATION OF ETHYLENE IN THE GAS PHASE

The fluid powder obtained is introduced into a 2 litre stirred metal reactor purged with nitrogen. The temperature is brought to 60° C. The reactor is then supplied with stirring with an ethylene flow of 8 l/h for 30 minutes. The flow is subsequently doubled for an equal period of time. Finally, the reactor is supplied with 32 l/h of ethylene for 130 minutes. The ethylene is subsequently removed from the reactor and replaced by nitrogen at normal pressure. 183.7 g of polyethylene containing 233 ppm of zirconium and 3000 ppm of aluminium are recovered under a nitrogen atmosphere in a Schlenk tube.

2. POLYMERIZATION OF ETHYLENE IN THE GAS PHASE 10 g of prepolymer prepared above are introduced into an 8 litre stirred metal reactor. The temperature is raised to 85° C. with stirring. The reactor is supplied with 10 bar of ethylene. The pressure is kept constant throughout the polymerization by continuously supplying ethylene. After polymerizing for 2 hours, the ethylene is removed from the reactor and the temperature lowered to 30° C. 297 g of polymer are then recovered, i.e. a productivity of 8500 g of polyethylene per gram of solid catalytic component.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Process for the preparation of a solid catalytic component for the polymerization or copolymerization of olefins, comprising the steps of:

a step (a) of reaction between a support in the form of particles of a porous inorganic oxide exhibiting hydroxyl groups at its surface and a halogenated derivative which can be represented by the formula $R^1M^1X^1_3$, in which $R^1$ represents a hydrocarbon radical, $M^1$ represents a silicon, germanium or tin atom and $X_1$ represents a halogen atom, in order to obtain a solid $S^1$, then a step (b) of reaction between the solid $S^1$ and a compound C capable of grafting at least one group with the cycloalkadienyl skeleton L to the atom $M^1$ belonging to the species fixed to the support and resulting from $R^1M^1X^1_3$, at least one of the carbon atoms of the ring of the cycloalkadienyl radical being bonded to at least one hydrogen atom, in order to obtain a solid $S^2$, then a step (c) of reaction between the solid $S^2$ and a deprotonating agent D which can be represented by the formula $R^2M^2X^2_n$, in which $R^2$ represents a hydrocarbon atom or a hydrocarbon group, $M^2$ represents a lithium, sodium, potassium or magnesium atom, $X^2$ represents a halogen atom and n represents a number equal to 0, if $M^2$ is a lithium, sodium or potassium atom, or equal to 1, if $M^2$ is a magnesium atom, in order to obtain a solid $S^3$, then a step (d) of reaction between the solid $S^3$ and a derivative of a transition metal of formula $R^3_{y-z}M^3X_z$, in which $R^3$ represents a hydrocarbon radical, $M^3$ represents a transition metal from groups 4, 5, 6, 7, 8, 9 and 10 of the periodic classification of the elements, X represents a halogen and y and z represent integers, y being equal to 3 or 4 and z ranging from 1 to y.

2. Process according to claim 1, wherein the support is a porous inorganic oxide exhibiting, at its surface, 0.5 to 10 hydroxyl groups per $nm^2$.

3. Process according to claim 2, wherein the support exhibits, at its surface, 1 to 8 hydroxyl groups per $nm^2$.

4. Process according to claim 1, wherein the support exhibits a porosity ranging from 1 to 4 $cm^3/g$, a specific surface ranging from 100 to 600 $m^2/g$ and a mean particle size diameter ranging from 10 to 100 $\mu m$.

5. Process according to claim 1 wherein $M^1$ is silicon.

6. Process according to claim 5 wherein the halogenated derivative is methyltrichlorosilane.

7. Process according to claim 1 wherein L is a cyclopentadienyl or indenyl or methylcyclopentadienyl or tetramethylcyclopentadienyl radical.

8. Process according to claim 1, wherein D is a butyllithium.

9. Process according to claim 1 wherein the transition metal $M^3$ is selected from titanium, vanadium, hafnium, zirconium or chromium.

10. Process according to claim 1, wherein the derivative of a transition metal is selected from $TiCl_4$, $TiBr_4$, $TiI_4$, $ZrCl_4$, $ZrBr_4$, $ZrI_4$, $HfCl_4$, $HfBr_4$, $HfI_4$, $VCl_4$, $NbCl_4$, $TaCl_5$, $MoCl_5$ or $WCl_5$.

11. Process according to claim 1, wherein the derivative of a transition metal is a titanium halide or a zirconium halide or a hafnium halide.

12. Process according to claim 1, wherein the derivative of a transition metal is $ZrCl_4$.

13. Process according to claim 1, wherein the molar ratio of the halogenated derivative to the surface hydroxyl groups of the support is between 0.5 and 30.

14. Process according to claim 1, wherein the molar ratio of the amount of C to the amount of halogenated derivative ranges from 2 to 10.

15. Process according to claim 1, wherein the molar ratio of the amount of D to the amount of C ranges from 1 to 10.

16. Process according to claim 1, wherein the molar ratio of the amount of derivative of a transition metal to the amount of D ranges from 0.5 to 5.

17. Solid catalytic component obtained by the process of claim 1.

18. Process according to claim 13, wherein the molar ratio is from 1 to 20.

19. Process according to claim 14, wherein the molar ratio is from 2 to 4.

20. Process according to claim 15, wherein the molar ratio is from 1 to 5.

21. Process according to claim 16, wherein the molar ratio is 0.5 to 3.

22. Process according to claim 1, wherein the support is a porous inorganic oxide exhibiting, at its surface, 0.5 to 10 hydroxyl groups per $nm^2$, wherein $M^1$ is silicon, wherein L is a cyclopentadienyl or indenyl or methylcyclopentadienyl or tetramethylcyclopentadienyl radical, and wherein the derivative of a transition metal is a titanium halide, a zirconium halide or a hafnium halide.

* * * * *